(12) United States Patent
Wiese

(10) Patent No.: US 7,545,294 B2
(45) Date of Patent: Jun. 9, 2009

(54) METHOD FOR OPERATING A DIGITAL SENSOR

(75) Inventor: Peter Wiese, Kelkheim (DE)

(73) Assignee: Siemens VDO Automotive AG, Regensburg (DE)

( * ) Notice: Subject to any disclaimer, the term of this patent is extended or adjusted under 35 U.S.C. 154(b) by 0 days.

(21) Appl. No.: 11/996,570

(22) PCT Filed: Jul. 20, 2006

(86) PCT No.: PCT/EP2006/064447

§ 371 (c)(1),
(2), (4) Date: Feb. 25, 2008

(87) PCT Pub. No.: WO2007/012596

PCT Pub. Date: Feb. 1, 2007

(65) Prior Publication Data

US 2008/0204295 A1 Aug. 28, 2008

(30) Foreign Application Priority Data

Jul. 25, 2005 (DE) ........................ 10 2005 034 672

(51) Int. Cl.
*H03M 1/06* (2006.01)
(52) U.S. Cl. ........................ 341/118; 341/119; 341/120; 341/142; 341/155
(58) Field of Classification Search ................. 341/118, 341/119, 120, 142, 155
See application file for complete search history.

(56) References Cited

U.S. PATENT DOCUMENTS

| 4,549,180 | A |  | 10/1985 | Masuda | 340/870.04 |
|---|---|---|---|---|---|
| 4,751,654 | A |  | 6/1988 | Lyyra | 364/482 |
| 6,396,427 | B1 | * | 5/2002 | Mattes et al. | 341/139 |
| 6,424,143 | B1 | * | 7/2002 | Blossfeld et al. | 324/160 |
| 6,594,612 | B2 | * | 7/2003 | Moch | 702/123 |
| 6,758,102 | B2 | * | 7/2004 | Henry et al. | 73/861.356 |
| 6,873,277 | B1 | * | 3/2005 | Frick | 341/143 |
| 6,977,518 | B2 | * | 12/2005 | Higashihama et al. | 324/771 |
| 7,042,376 | B1 | * | 5/2006 | Regier et al. | 341/141 |
| 7,372,272 | B2 | * | 5/2008 | Habara et al. | 324/318 |
| 7,404,336 | B2 | * | 7/2008 | Henry et al. | 73/861.356 |

FOREIGN PATENT DOCUMENTS

| DE | 4324197 A1 | 2/1994 |
|---|---|---|
| DE | 19946917 A1 | 4/2001 |

OTHER PUBLICATIONS

Integrated Rotational Speed Sensor, Product Specification, Philips Semiconductors, 16 pages.

* cited by examiner

*Primary Examiner*—Linh V Nguyen
(74) *Attorney, Agent, or Firm*—King & Spalding L.L.P.

(57) ABSTRACT

The sensor has only a first contact (1) and a second contact (2). In the first step of the method, current is passed through the sensor element (3) while simultaneously measuring the measured variable using a closed switch (4). In a second step, the measured value is then converted into a digital signal in an analogue/digital converter (5) and the digital signal is transformed into a digital output value in a digital switching mechanism (6) which is connected downstream of the analogue/digital converter (5). In a third step, the digital output value is serially sent via the first contact (1) and the second contact (2) with the switch (4) open or closed depending on the binary structure of the digital output value.

20 Claims, 1 Drawing Sheet

METHOD FOR OPERATING A DIGITAL SENSOR

CROSS-REFERENCE TO RELATED APPLICATIONS

This application is a U.S. national stage application of International Application No. PCT/EP2006/064447 filed Jul. 20, 2006, which designates the United States of America, and claims priority to German application number 10 2005 034 672.3 filed Jul. 25, 2005, the contents of which are hereby incorporated by reference in their entirety.

TECHNICAL FIELD

The invention relates to a method for operating a digital sensor.

BACKGROUND

Methods for operating digital sensors are known. Digital sensors are described in "Discrete Semiconductors, DATA SHEET, KMI 15/1, Integrated rotational speed sensor, PHILIPS, 5 Sep. 2000, pp. 1-16". They are only provided with two contacts and have internally within them a switchable current source, which may involve the arrangement of a transistor. Such a transistor is specifically illustrated on page 5 in FIG. 4 block diagram. In these digital sensors, the sensor elements are permanently energized during the method for operating the digital sensor. What is disadvantageous about these known methods is that supplementarily connecting an additional load can lead to thermal problems, especially as in some instances high electric currents can then be recorded.

SUMMARY

The exist a need for a method for operating a digital sensor in which said thermal problems are largely avoided. At the same time, the exists a need to largely minimize the power loss and the current consumption.

According to an embodiment, a method for operating a digital sensor which has only a first contact and a second contact, may comprise the steps of: in a first step, energizing the sensor element while simultaneously measuring the measurement variable by means of a closed switch, in a second step, converting the measured value subsequently into a digital signal in an analog-to-digital converter, transforming said digital signal into a digital output value in a digital switching mechanism connected downstream of the analog-to-digital converter, and in a third step, transmitting the digital output value serially via the first contact and the second contact with the switch open or closed depending on the binary structure of the digital output value, wherein a choice is made as to whether the switch is open in the case of the bit information 1 or the bit information 0.

According to a further embodiment, in the second step, after the measured value has been converted in the analog-to-digital converter, the switch may firstly be opened and may only closed again if the digital output value present for transmission from the digital switching mechanism requires a raising of the current level. According to a further embodiment, the measurement variable may be measured by means of measuring bridges arranged as sensor element and the measured value may be fed to the analog-to-digital converter via a differential amplifier.

BRIEF DESCRIPTION OF THE DRAWINGS

The invention is explained in more detail and by way of example below with reference to the drawing (FIG. 1, FIG. 2).

DETAILED DESCRIPTION

Figure 1:
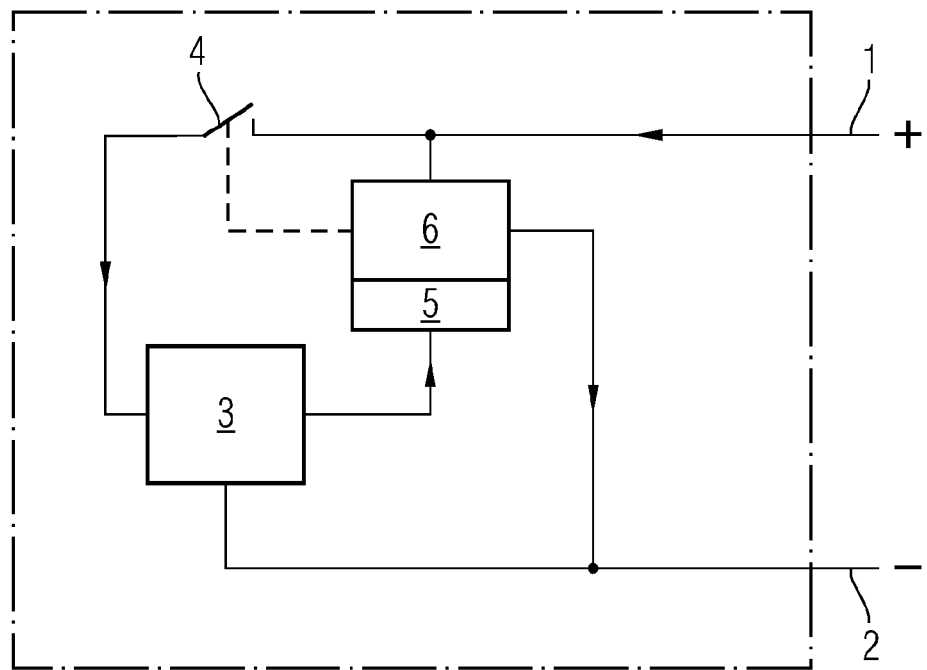
FIG. 1 shows a block diagram relating to the method for operating a digital sensor.

According to an embodiment as stated above, in a method for operating a digital sensor which has only a first contact and a second contact, in a first step, the sensor element is energized while simultaneously measuring the measurement variable by means of a closed switch, in a second step, with the switch opened, the measured value is subsequently converted into a digital signal in an analog-to-digital converter and said digital signal is transformed into a digital output value in a digital switching mechanism connected downstream of the analog-to-digital converter, in which, in a third step, the digital output value is serially transmitted via the first contact and the second contact with the switch open or closed depending on the binary structure of the digital output value. The digital sensor should be understood to be a sensor in which the arrangement of a digital switching mechanism is provided. The first contact and the second contact may serve for supplying the sensor with current and for transferring or transmitting digital output values. The sensor element can be a measuring sensor. This may be a temperature sensor, for example. A transistor, for example, may be used as the switch. By virtue of the fact that the signal is present in digitized form, it can advantageously be linearized prior to conversion into a serial data stream in the digital switching mechanism. The order of first to third steps of the method is repeated as often as desired, depending on the desired measurement sequence. It has surprisingly been found that thermal problems can be avoided almost completely by the method. In addition, the arrangement of a switchable current source, as is provided according to the prior art, can advantageously be dispensed with. At the same time, the power loss and the current consumption are advantageously minimized. By virtue of the intermittent interruption of the energization of the sensor element, the latter is advantageously treated mildly, which increases the lifetime of the digital sensor.

According to an embodiment, in the second step, after the measured value has been converted in the analog-to-digital converter, the switch can be firstly opened and can be only closed again if the digital output value present for transmission from the digital switching mechanism requires a raising of the current level. In this case, it may be advantageous that an energization of the sensor element also fails to occur during the processing of the measured value in the analog-to-digital converter or in the digital switching mechanism connected downstream, such that thermal problems are completely avoided.

A further embodiment, the measurement variable can be measured by means of measuring bridges arranged as sensor element and the measured value is fed to the analog-to-digital converter via a differential amplifier. Two measuring bridges each having magnetic-field-dependent resistors are generally used in this case. It is advantageous in this case that rotation angle positions of throttle valves in throttle valve connectors can be determined, and at the same time it is advantageously possible to avoid a relatively large current consumption in the digital sensor.

A block diagram relating to the method for operating a digital sensor is schematically illustrated in a simplified manner in FIG. 1. The sensor has a first contact 1 and a second contact 2. In the first step of the method for operating a digital sensor, the sensor element 3 is energized while simultaneously measuring the measurement variable by means of a closed switch 4, which is illustrated in the open state in FIG. 1. In a second step, the measured value determined is subsequently converted into a digital signal in an analog-to-digital converter 5. Said digital signal is transformed into a digital output value in a digital switching mechanism 6 connected downstream of the analog-to-digital converter 5. In a third step, said digital output value is serially transmitted via the first contact 1 and the second contact 2 with the switch 4 open or closed depending on the binary structure of the digital output value. In this case, it is necessary, of course, correspondingly to choose whether the switch 4 is open in the case of the bit information 1 or in the case of the bit information 0. The arrangement of a switchable current source can advantageously be dispensed with in this method. However, it is also possible additionally to arrange a polarity reversal protection diode (not illustrated) or a voltage regulator (not illustrated) in the digital sensor, but this is not absolutely necessary and is generally dependent on what the customer desires. By way of example, an arrangement of two measuring bridges (not illustrated) may be provided as the sensor element 3, in which case the measured value must then be fed to the analog-to-digital converter 5 via a differential amplifier (not illustrated).

Figure 2:
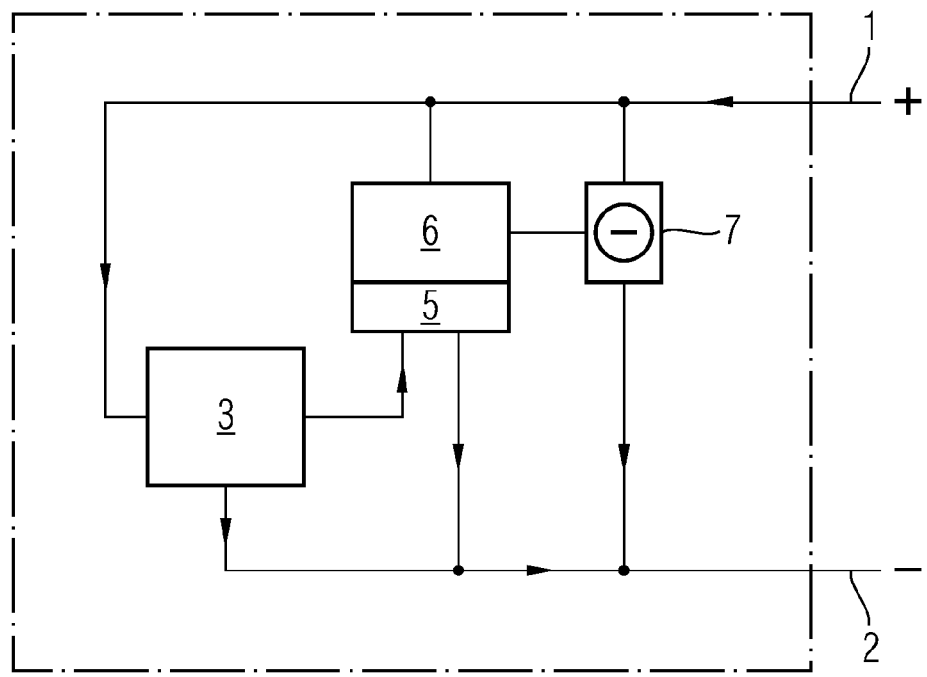
FIG. 2 shows a block diagram relating to the method for operating a digital sensor according to the prior art.

FIG. 2 illustrates a block diagram relating to the method for operating a digital sensor according to the prior art. In contrast to the block diagram illustrated in FIG. 1, according to the prior art the arrangement of a switch is entirely dispensed with in this case, the consequence of which is that the sensor element 3 is continuously energized in the method for operating the digital sensor according to the prior art. Furthermore, the prior art provides for arranging a switchable current source 7 in a corresponding manner, which may involve the arrangement of a transistor, for example. In this case, it is disadvantageous that a relatively large current consumption can be recorded in the method for operating the digital sensor according to the prior art, whereby disadvantageous thermal problems occur after relatively short operating times.

What is claimed is:

1. A method for operating a digital sensor which has only a first contact and a second contact, the method comprising the steps of:
   in a first step, energizing the sensor element while simultaneously measuring the measurement variable by means of a closed switch,
   in a second step, converting the measured value subsequently into a digital signal in an analog-to-digital converter,
   transforming said digital signal into a digital output value in a digital switching mechanism connected downstream of the analog-to-digital converter, and
   in a third step, transmitting the digital output value serially via the first contact and the second contact with the switch open or closed depending on the binary structure of the digital output value, wherein a choice is made as to whether the switch is open in the case of the bit information 1 or the bit information 0.

2. The method according to claim 1, wherein in the second step, after the measured value has been converted in the analog-to-digital converter, the switch is firstly opened and is only closed again if the digital output value present for transmission from the digital switching mechanism requires a raising of the current level.

3. The method according to claim 1, wherein the measurement variable is measured by means of measuring bridges arranged as sensor element and the measured value is fed to the analog-to-digital converter via a differential amplifier.

4. The method according to claim 2, wherein the measurement variable is measured by means of measuring bridges arranged as sensor element and the measured value is fed to the analog-to-digital converter via a differential amplifier.

5. A system for operating a digital sensor which has only a first contact and a second contact, comprising:
   a switch for energizing the sensor element while simultaneously measuring the measurement variable,
   an analog-to-digital converter for converting the measured value subsequently into a digital signal,
   a digital switching mechanism for transforming said digital signal into a digital output value connected downstream of the analog-to-digital converter, and
   wherein for transmitting the digital output value serially via the first contact and the second contact the switch is operable to be open or closed depending on the binary structure of the digital output value, wherein a choice is made as to whether the switch is open in the case of the bit information 1 or the bit information 0.

6. The system according to claim 5, wherein after the measured value has been converted in the analog-to-digital converter, the switch is firstly opened and is only closed again if the digital output value present for transmission from the digital switching mechanism requires a raising of the current level.

7. The system according to claim 5, wherein the measurement variable is measured by means of measuring bridges arranged as sensor element and the measured value is fed to the analog-to-digital converter via a differential amplifier.

8. The method according to claim 6, wherein the measurement variable is measured by means of measuring bridges arranged as sensor element and the measured value is fed to the analog-to-digital converter via a differential amplifier.

9. The system according to claim 7, wherein each measuring bridge comprises magnetic-field-dependent resistors.

10. The system according to claim 5, wherein the digital sensor element is a measuring sensor.

11. The system according to claim 10, wherein the digital sensor element is a temperature sensor.

12. The system according to claim 5, wherein the switch is formed by a transistor.

13. A system for operating a digital sensor which has only a first contact and a second contact, comprising:
   a switch for energizing the sensor element while simultaneously measuring the measurement variable,
   an analog-to-digital converter for converting the measured value subsequently into a digital signal,
   a digital switching mechanism for transforming said digital signal into a digital output value connected downstream of the analog-to-digital converter, and
   means controlling said switch for transmitting the digital output value serially via the first contact and the second contact wherein the switch is operable to be open or closed depending on a bit information of the digital output value.

14. The system according to claim 13, wherein a choice is made as to whether the switch is open in the case of the bit information 1 or the bit information 0.

15. The system according to claim 13, wherein after the measured value has been converted in the analog-to-digital converter, the switch is firstly opened and is only closed again if the digital output value present for transmission from the digital switching mechanism requires a raising of the current level.

16. The system according to claim 13, wherein the measurement variable is measured by means of measuring bridges arranged as sensor element and the measured value is fed to the analog-to-digital converter via a differential amplifier.

17. The system according to claim 16, wherein each measuring bridge comprises magnetic-field-dependent resistors.

18. The system according to claim 13, wherein the digital sensor element is a measuring sensor.

19. The system according to claim 18, wherein the digital sensor element is a temperature sensor.

20. The system according to claim 13, wherein the switch is formed by a transistor.

* * * * *